United States Patent [19]

Hudson et al.

[11] Patent Number: 5,300,135

[45] Date of Patent: Apr. 5, 1994

[54] ABRASION RESISTANT COATINGS FOR FERTILIZERS

[75] Inventors: Alice P. Hudson, Lake Park; Fred E. Woodward, W. Palm Beach, both of Fla.

[73] Assignee: The O. M. Scott & Sons Company, Marysville, Ohio

[21] Appl. No.: 74,141

[22] Filed: Jun. 9, 1993

Related U.S. Application Data

[63] Continuation of Ser. No. 655,157, Feb. 14, 1991, abandoned.

[51] Int. Cl.$^5$ .............................................. C05C 9/00
[52] U.S. Cl. ............................... 71/28; 71/64.07; 71/64.11; 71/64.13
[58] Field of Search ......................... 71/28–30

[56] References Cited

U.S. PATENT DOCUMENTS

| | | | |
|---|---|---|---|
| 3,192,031 | 6/1965 | Zaayenga | 71/64.11 X |
| 3,372,019 | 3/1968 | Fox | 71/64.11 |
| 3,576,613 | 7/1967 | Fleming | 71/64 |
| 3,903,333 | 9/1975 | Shirley, Jr. et al. | 427/212 |
| 4,042,366 | 8/1977 | Fersch et al. | 71/64.12 |
| 4,676,821 | 6/1987 | Gullett et al. | 71/64.12 |
| 4,881,963 | 11/1989 | Fujita et al. | 71/64.07 |
| 4,881,963 | 11/1989 | Fujita et al. | 71/64.07 |
| 5,147,442 | 9/1992 | Kosuge et al. | 71/64.07 |

FOREIGN PATENT DOCUMENTS

| | | | |
|---|---|---|---|
| 4127459 | 2/1993 | Fed. Rep. of Germany | 71/64.07 |
| 1435678 | 6/1974 | United Kingdom | 71/64.07 |

*Primary Examiner*—Ferris Lander
*Attorney, Agent, or Firm*—Jones, Day, Reavis & Pogue

[57] ABSTRACT

Mixtures of hydrocarbon waxes and hydrocarbon soluble polymers which have oxygen containing polar groups provide an abrasion resistant sealant coating for sulfur coated urea.

5 Claims, No Drawings

ABRASION RESISTANT COATINGS FOR FERTILIZERS

This is a continuation of copending application Ser. No. 07/655,157, filed Feb. 14, 1991, now abandoned.

BACKGROUND OF THE INVENTION

1. Field of the Invention:

Urea granules or prills which have been coated with sulfur to slow the rate of dissolution of the urea in the soil when they are applied as a fertilizer can be coated with a sealant to further slow the release. This application relates to improved sealant compositions which provide abrasion resistance to sulfur coated urea.

2. Description of the Prior Art:

The process for sulfur coating of urea granules or prills was developed in 1968 by the Tennessee Valley Authority (TVA) in Muscle Shoals, Ala., as an economical system for reducing the rate of dissolution of urea particles when they are applied to the soil as fertilizer. U.S. Pat. No. 3,342,577 describes this sulfur coating process and also the sealant material that was necessary to fill in the holes that result naturally in the sulfur coating as it cools. The TVA process is also described in Sulphur Inst. J. 4(3) 2-6 (1968), ibid. 8(4) 2-5 (1972a) and ibid. 8(4) 6-8 (1972b). The TVA recommendation for the sealant now used by the majority of manufacturers of sulfur coated urea is a mixture of 30% polyethylene resin 70% bright stock mineral oil.

The process is further described in *Sulfur Coating of Urea Treated with Atapulgite Clay*, Gullett, G. L.; Simmons, C. L.; and Lee, R. G.; presented at the 198th American Chemical Society meeting in Miami Beach, Fla., in September 1989.

The requirement for a sealant for sulfur coated urea (SCU) has been documented by McClellan and Scheib (Sulphur Inst. J. 9(3) 8-12 (1973), and by Scheib and McClellan ibid. 12(1) 2-5 (1976).

A description of slow release urea and NPK fertilizers is given in Hort. Rev. 1 79-140 (1979).

Paraffin waxes have been used to produce relatively slow dissolving clathrate complexes with urea by processes which do not relate to coating urea prills, but instead involve a solution or dispersion of urea in paraffin, as described in U.S. Pat. No. 3,252,786.

Paraffin has not been used as a slow release coating for urea because of its lack of adhesion. Also paraffin has not been used as a sealant for SCU for the same reason and also because when the SCU prills or granules are handled in high speed bulk moving equipment wherein large amounts of product are moved by hopper car or by truck and off-loaded into storage bins, the coating is rubbed off or otherwise cracked or abraded.

The wax-oil sealants as described by TVA publications and currently being applied to SCU require the addition of a clay conditioning agent at levels nearly equal to that of the wax sealant to prevent caking and provide a free flowing product. A typical process may require 3% of the wax-oil sealant and 2% of the clay conditioning agent on the weight of the SCU, or 67% clay on the weight of the sealant. This requires large scale clay handling equipment in addition to the equipment necessary to apply the molten sulfur and wax sealant.

When the clay conditioned SCU is applied in the field by mechanical spreaders, the clay or wax-clay mixtures tend to be removed from the SCU particles by the abrasive action of the screw conveyors and the mechanical spreading wheel, resulting in a build-up of wax-clay on various parts of the machine and requiring frequent shut-downs for cleaning.

An additional problem with SCU from current production methods is the reduction or less in WIN which occurs on shipping the SCU from the production point to the local blending point. This loss is exacerbated by the further abrasion which occurs in the blending and bagging operations. Urea and blended fertilizers when they are mixed and bagged must be labelled with the WIN content, and it is the responsibility of the manufacturer to assure that the value does not decrease below the labeled value during shipping and storage. Thus a significant loss in WIN resulting from handling in modern high-speed equipment can create a situation in which the fertilizer is mislabeled and subject to recall.

OBJECTS

It is an object of this invention to provide sealants for SCU which will act to give the SCU granules or prills high water insoluble nitrogen (WIN) values and thus provide urea prills or granules which will release the urea to the soil at a slow uniform rate over an extended period of time.

It is a further object of this invention to provide a sealant for SCU which can be readily applied to the SCU particles in a molten form, and provides a sealed SCU product which becomes non-tacky and free flowing on cooling to ambient temperature, and therefore does not require a large amount of clay or other conditioning agent and thus minimizes the build-up of deposits in the field application equipment.

A further object of this invention is to provide a sealant for SCU which provides high WIN values which are not significantly decreased by the abrasion encountered in shipping, mixing, bagging, and storage.

SUMMARY OF THE INVENTION

We have discovered that urea prills or granules coated with sulfur in accordance with the methods developed by the TVA, and subsequently sealed with hydrocarbons wax-polymer composites provide an abrasion resistant fertilizer or fertilizer component with a slow release rate of soluble nitrogen to the soil.

The wax-polymer composites are prepared by mixing certain polymers which have a carbon backbone and oxygen containing polar groups in their side chains with certain hydrocarbon waxes.

The polymers are chosen from the group consisting of:

A. Ethylene-vinyl acetate copolymers in which the weight ratio of ethylene to vinyl acetate is from about 20 to about 2, and the molecular weight is from about 2000 to 20,000; and B. Ethylene-acrylic acid copolymers in which the weight ratio of ethylene to acrylic acid is from about 50 to about 10, and the molecular weight is from about 2000 to 20,000.

The hydrocarbon waxes are chosen from

A. Natural petroleum waxes containing less than about 5% oil which have melting points between about 60° and 80° C. and are essentially free of aromatic and cyclic structures;

B. Synthetic hydrocarbon waxes which melt between about 60° C. and 105° C.

The wax-polymer composites are applied to SCU at levels from about 0.75% to about 10%.

DESCRIPTION OF THE PREFERRED EMBODIMENTS

We have discovered abrasion resistant and non-blocking or free flowing sealants for SCU can be made by mixing about 5 to about 50% of a hydrocarbon soluble polymer with a hydrocarbon wax. The preferred polymers are taken from that group of products designed to provide tack and adhesion to hot melt adhesives and thus that they should provide non-blocking properties in the present application is surprising and unexpected.

The polymers and copolymers of the invention are chosen from the group consisting of:

A. Ethylene-vinyl acetate copolymers in which the weight ratio of ethylene to vinyl acetate is from about 20 to about 2, and the molecular weight is from about 2000 to 20,000; and B. Ethylene-acrylic acid copolymers in which the weight ratio of ethylene to acrylic acid is from about 50 to about 10, and the molecular weight is from about 2000 to 20,000.

Such polymers are soluble in all proportions in paraffinic hydrocarbons and the resulting composites have melting points of less than about 105° C., preferably less than 90° C., and most preferably from about 60° C. to 85° C.

Suitable ethylene-vinyl acetate copolymers are produced and marketed by a number of manufacturers. Products useful in the present invention include ELVAX Resins produced by Du Pont, A-C 400 series of resins produced by Allied Corporation, ESCORENE Resins produced by Exxon Chemical Company, ELVACE Resins produced by Reichhold Chemicals, Inc., and EVA copolymers produced by Union Carbide Corporation. The vinyl acetate content is from about 5% to about 30% by weight of the copolymer. If less than 5% vinyl acetate is present, the copolymer does not significantly improve the adhesion properties of the final sealant coating, and if more than 30% vinyl acetate is present the resulting copolymer is not compatible with the hydrocarbon wax portion of the sealant.

The molecular weight of the copolymer is such that the viscosities of the molten copolymer-hydrocarbon wax mixtures are sufficiently low as to be easily applied through a nozzle to the SCU.

Ethylene acrylic copolymers are produced by Allied Corporation under the trade names A-C 540, A-C 580, and A-C 5120, and by Dow Chemical Company under the trade name PRIMACOR. In the copolymers useful in the present invention the acrylic acid comprises a maximum of about 10% by weight of the copolymer. Copolymers with a higher acrylic acid content are not compatible with the hydrocarbon wax materials.

The polymers are modified by the addition of sufficient hydrocarbon wax materials herein described so that their melting or softening point is from about 40° C. to about 110° C., and preferably from about 60° to 100° C., and most preferably from about 65° C. to 85° C.

The hydrocarbon wax materials are chosen from a. Petroleum or mineral waxes characterized by having a range of melting points from about 38° C. to about 80° C. They also contain varying amounts of oil, which is arbitrarily defined as that portion of the wax which is soluble in methyl ethyl ketone at 31.7° C. (ASTM method D721). They are produced from crude oils by a variety of refining methods. Their compositions and physical properties are a continuum and can only be defined specifically by the refining method used for isolating the wax from oil from a specific oil field.

The preferred petroleum waxes are characterized by having a drop melt point of 60° C. or higher; and by having an oil content of less than about 5%, preferably less than about 2% and most preferably less than about 0.5%; and by being essentially free of aromatic or cyclic hydrocarbons. They form larger more regular crystals when cooling from the melt, which gives them good moisture vapor barrier properties but also makes them brittle.

Examples of suitable petroleum waxes include microcrystalline waxes which typically have an oil content of 5 to 15%, slack waxes which typically have an oil content of 5 to 15%, scale waxes which typically have an oil content of 2 to 5%, paraffin waxes which typically have an oil content of 1 to 2%, and fully refined paraffin waxes which typically have an oil content of less than about 1%.

b. Synthetic waxes, including polyethylene waxes represented by a product called Gulftene C30+. This is a synthetic wax made by the polymerization of ethylene. The process for its production is designed to maximize the degree of polymerization at about 10 to 18 carbon atoms. The waxes useful in our coatings are the residues from removing most of the polyethylenes up to about 28 carbons. A typical composition for this wax is described by the size of the hydrocarbon wax molecules and the position of the olefin moiety. Waxes useful in this invention have 3 to 20% $C_{24-28}$ hydrocarbons, 60 to 95% $C_{30-56}$ hydrocarbons, and 0 to 20% $C_{56}$ and higher hydrocarbons. They consist of 0.5 to 2% paraffins (with no unsaturation), 30–40% hydrocarbons with vinylidine double bonds, 8–12% hydrocarbons with internal double bonds, and 50–55% hydrocarbons with alpha double bonds. The drop melt point is about 71° C.

Another suitable synthetic wax is Polywax 500 manufactured by Petrolite. It is a polyethylene with an average molecular weight of 500, a drop point of 86° C., and viscosity at 149° C. of 3 centipoise.

The waxes described above differ from polyethylenes such as the products produced by Allied Corporation and sold under the trade names A-C6 and A-C1702, for example. The hydrocarbon waxes of this invention have average molecular weights in the range of 400 to 600, and form large crystalline regions on melting and cooling. The polyethylenes as represented by A-C6 and A-C1702 have average molecular weights of about 2000 and 1600, drop melting points of 106° C. and 92° C. respectively, and are largely amorphous. They are produced by a substantially different manufacturing process.

Hydrocarbon wax materials as described in b are preferred. Wax materials represented by the composition of Gulftene C30+ is most preferred.

The solid composite materials at room temperature have densities greater than about 0.915 g/cc.

The composites are further characterized by being non-blocking as films on a substrate of sulfur at 42° C. when tested by the following method: A 10 g sample of SCU to which a sealant composition has been applied is placed in an aluminum dish, and a 100 g weight is placed on top of the urea sample. The weighted urea sample is placed in an oven at 42° C. After 30 minutes, the weighted sample is removed from the oven and allowed to equilibrate to room temperature. The weight is removed, and the degree to which the coated SCU particles adhere to each other is evaluated. SCU sealed with the compositions of this invention do not adhere to each other by this test and thus will remain free-flowing after storage in bags or in storage bins at 42° C.

The composites of this invention are further characterized by having a high specific adhesion coefficient for solid sulfur. Thus a drop of the composites in molten form placed on a heated surface of solid sulfur will spread spontaneously and the leading edge of the spreading film will have an angle of less than 45 degrees and preferably less than 15 degrees.

Other minor adjuvants commonly added to wax barrier coatings, such as antioxidants and microbicides, which are known to those skilled in the art, may be advantageously incorporated into the compositions of this invention.

Another aspect of this invention is to the process for sealing SCU particles or other fertilizer particles with the compositions of this invention. The process is dependent on the absence of volatile components in the compositions; the tendency of the compositions to spread spontaneously on the surface of the fertilizer particles, and thus give a coating free of voids and pin holes; and the relatively low viscosity of the molten compositions which allows them to be sprayed or otherwise metered onto the fertilizer particles.

The process in its essential part involves contacting the sealant compositions with the sulfur coated fertilizer granules at a temperature above the melting point of the sealant composition with sufficient agitation to allow for a uniform coating, and cooling with continuous agitation to ambient temperature.

A preferred process is to place the SCU or other fertilizer particles in a pan granulator, rotating drum, or other suitable mixing device for solid particles, warm the particles to about 70° C. to 100° C. and preferably to about 78° to 88° C., and introduce the sealant composition either in the form of a spray or liquid stream, or in a most preferred process in the form of small pellets or prills of about 0.5 to 2 mm in diameter which melt immediately on contacting the heated SCU granules. The sealed SCU is cooled in a rotating drum or in a fluid bed cooler, and becomes free flowing without the aid of a clay or other conditioning agent.

The following examples are provided to illustrate the preferred composition, the preferred method of preparation, and comparative evaluations with prior art compositions. In these examples and throughout the remainder of this disclosure, all percentages are by weight based on the total weight of all components in the described compositions.

EXAMPLE 1

75 g of Gulftene C30+ and 25 g of ELVAX 420 (18% vinyl acetate) and warmed with stirring to 180° C., and stirred at this temperature for 30 minutes. The resulting mixture had a viscosity of 300 to 340 centipoise at 125° C., and a melting point of 75° C.

100 g of sulfur coated urea granules (1-2 mm diameter) are placed in a heated pan and warmed to 75° C. 2.0 g of the Gulftene-Elvax mixture melted at 80° C. was added in a thin stream while the SCU particles were stirred. The sealant composition spread spontaneously to a uniform coating of molten wax on the urea. Mixing was continued for about 1 minute. The pan was removed from the heat source and stirring continued until the coated urea had reached a temperature below 45° C., at which point the particles were free flowing.

EXAMPLE 2

By the same procedure as in Example 1 the following compositions were prepared and applied to SCU:
A. 25% ELVAX 265 (28% vinyl acetate), 75% Gulftene C30+
B. 10% ELVAX 265, 90% Gulftene C30+
C. 25% ELVAX 265, 75% paraffin wax, mp 65° C.
D. 25% ELVAX 420, 75% paraffin wax, mp 65° C.
E. 25% ELVAX 420, 75% slack wax
F. 25% A-C 400A (13% vinyl acetate), 75% Gulftene C30+
G. 5% A-C 540A (5% acrylic acid), 94% Gulftene C30+
H. 38% A-C 540A, 62% Gulftene C30+

EXAMPLE 3

The TVA recommended composition was prepared by mixing 70 g of Shellflex 790, which is a hydrotreated solvent extracted paraffinic oil, equivalent to HVI-150 Britestock (sp. gr. 0.905, mw 600-650, viscosity 30-35 SSU at 100° C.) and 30 g of A-C6 polyethylene (drop point 106° C.). It was applied at 3% to SCU granules. The resulting particles were extremely tacky and required 2 g of diatomaceous earth to render them free flowing.

EXAMPLE 4

The abrasion resistance of the SCU to which sealant coatings had been applied was tested by the following procedure:

A 90 g sample of coated SCU was placed in a glass jar (9 cm diameter × 16.7 cm height) and the jar was capped. The jar was turned on its side and shaken vigorously in an up and down motion, with particles hitting the sides of the jar, for 30 m seconds. The amount of dust (yellow sulfur particles) and wax deposited on the jar was evaluated. The coated urea particles which had been abraded in this manner were then tested for WIN as described below and the results compared with a sample of the product which had not been abraded.

To determine water insoluble nitrogen (WIN), 10 g of the coated SCU to be tested and 90 g of distilled water were placed in a polyethylene bottle and swirled gently. The bottle was capped and allowed to stand undisturbed for 24 hours, at which time it was gently swirled again and the urea dissolved in the water was determined from the refractive index of the solution. The dissolved urea was determined again after 4 days and after 7 days. The results are reported as percent WIN, obtained from subtracting the dissolved portion from the added portion to determine the remaining portion.

| Wax Coating | Dust | Wax Deposit | % WIN in 7 days Not abraded | Abraded |
|---|---|---|---|---|
| Example 1 | Slight | None | 83 | 60 |
| Example 2A | Slight | None | 81 | 70 |
| Example 2C | Slight | Moderate | 90 | 83 |
| Example 2D | Slight | Moderate | 91 | 64 |
| Gulftene C30+ | Heavy | Heavy | 83 | 63 |
| Paraffin, mp 65C | Moderate | Heavy | 81 | 68 |
| None | Heavy | — | 36 | 25 |
| Comparative Example 3 | None | None | 71 | 60 |

The embodiments of the invention in which an exclusive property or privilege is claimed are defined as follow:

1. An attrition resistant, free-flowing non-smearing essentially dustless slow release fertilizer composition consisting essentially of:
   a particulate water soluble urea core having a sulfur coating layer applied directly onto the surface of said fertilizer core,
   said sulfur coating layer being coated with from about 0.75 to about 10 percent (by weight of the fertilizer composition) of a topcoating composition which is essentially non-flowable at ambient temperature and has a melting point of from about 60° C. to about 105° C.;
   said topcoating composition providing a hard outer coating over said sulfur coating layer and being non-smearing at ambient temperature whereby said sulfur coated fertilizer composition is rendered essentially dust-free on handling,
   said top-coating composition comprising a mixture of about 5 to about 50 percent (by weight of the topcoating composition) of a polymer and about 95 to about 50 percent (by weight of the topcoating composition) of a hydrocarbon wax;
   said polymer being selected from the group consisting of ethylene-vinyl acetate copolymers in which the weight ratio of ethylene to vinyl acetate is from about 20 to about 2 and the number molecular weight is from about 2000 to 20,000; and ethylene-acrylic acid copolymers in which the ratio of ethylene to acrylic acid is from about 50 to about 10 and the number molecular weight is from about 2000 to 20,000 and mixtures thereof; and
   said hydrocarbon wax being selected from the group consisting of natural petroleum waxes having drop melting points between about 60° C. and 80° C., containing less than about 5% oil as determined by ASTM method D721, and being essentially free of aromatic or cyclic structures; synthetic hydrocarbon waxes melting between about 60° C. and 105° C., and having molecular weights between about 400 and 600 and mixtures thereof.

2. The composition of claim 1 in which the hydrocarbon wax is a synthetic olefin mixture with an average molecular weight of greater than 400, and comprises essentially 0.5 to 2% paraffins, 30–40% hydrocarbons with vinylidine double bonds, 8–12% hydrocarbons with internal double bonds, and 50–55% hydrocarbons with alpha double bonds, and a drop melt point of about 69° to 75° C.

3. The composition of claim 1 in which the hydrocarbon wax is a paraffin which contains less than 0.5% oil as determined by ASTM D721, and has a drop melting point of about 60° to 70° C.

4. The composition of claim 1 in which the polymer is an ethylene vinyl acetate copolymer containing from about 10 to about 30% vinyl acetate.

5. A process for producing an abrasion resistant, free-flowing, non-smearing, essentially dustless slow release particulate fertilizer consisting essentially of:
   providing a quantity of sulfur coated urea particles having the sulfur applied directly onto the surface of said fertilizer particles;
   adding a metered stream of a topcoating composition to said fertilizer particles, either as a molten liquid or as pellets or prills less than 2 mm in diameter, at a temperature of from about 70° C. to about 100° C.;
   said topcoating composition being essentially non-flowable at ambient temperatures and having a melting point of from about 60° C. to about 105° C., said topcoating composition comprising a mixture of about 5 to about 50 percent (by weight of the topcoating composition) of a polymer and about 95 to about 50 percent (by weight of the topcoating composition) of a hydrocarbon wax;
   said polymer being selected from the group consisting of ethylene-vinyl acetate copolymers in which the weight ratio of ethylene to vinyl acetate is from about 20 to about 2 and the number molecular weight is from about 2000 to 20,000; ethylene-acrylic acid copolymers in which the ratio of ethylene to acrylic acid is from about 50 to about 10 and the number molecular weight is from about 2000 to 20,000 and mixtures thereof;
   said hydrocarbon wax being selected from the group consisting of natural petroleum waxes having drop melting points between about 60° C. and 80° C., containing less than about 5% oil as determined by ASTM method D721, and being essentially free of aromatic or cyclic structures; synthetic hydrocarbon waxes melting between about 60° C. and 105° C., and having molecular weights between about 400 and 600 and mixtures thereof;
   agitating the mixture of topcoating composition and sulfur coated fertilizer particles in a manner such that a mixing of said mixture is achieved; and
   cooling the mixture with agitation to ambient temperature to provide a fertilizer having a hard outer coating applied over said sulfur coating layer which is non-smearing at ambient temperature and said fertilizer is essentially dust-free on handling.

* * * * *

UNITED STATES PATENT AND TRADEMARK OFFICE
CERTIFICATE OF CORRECTION

PATENT NO. : 5,300,135
DATED : April 5, 1994
INVENTOR(S) : Alice P. Hudson, Fred E. Woodward It is certified that error appears in the above—identified patent and that said Letters Patent is hereby corrected as shown below:

Column 1, line 30, after "resin" insert --in--.

Column 2, line 11, change "the" to --their--.

Column 2, line 43, change "hydrocarbons" to --hydrocarbon--.

Column 4, line 19, change "1%" to --1.5%--.

Column 6, line 37, delete "m".

Column 7 :
Claim 1, line 4, after "free-flowing" add --,--.

Claim 1, line 15, change ";' to --,--.

Signed and Sealed this

Twenty-eight Day of February, 1995

Attest:

BRUCE LEHMAN

Attesting Officer

Commissioner of Patents and Trademarks